United States Patent
Cinarkaya et al.

(10) Patent No.: US 7,069,231 B1
(45) Date of Patent: Jun. 27, 2006

(54) METHODS AND SYSTEMS FOR DEFINING, APPLYING AND EXECUTING CUSTOMER CARE RELATIONSHIP PLANS

(75) Inventors: Bulent Cinarkaya, Belmont, CA (US); Javed Hasan, Sunnyvale, CA (US); Smita Kolhatkar, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 792 days.

(21) Appl. No.: 09/620,167

(22) Filed: Jul. 20, 2000

(51) Int. Cl.
$G06Q$ $10/00$ (2006.01)
(52) U.S. Cl. ....................................................... 705/10
(58) Field of Classification Search .................... 705/10
See application file for complete search history.

(56) References Cited

U.S. PATENT DOCUMENTS 5,806,060 A * 9/1998 Borgida et al. ................. 707/3
5,930,764 A * 7/1999 Melchione et al. ........... 705/10

(Continued)

FOREIGN PATENT DOCUMENTS

EP  735497 A2 * 10/1996

OTHER PUBLICATIONS

Galbreath et al., Customer Relationship Leadership: a Leadership and Motivation Model for the Twenty-First Century Business, The TQM Magazine, Bedford, vol. 11, Issue 3, 1999, start pp. 161 [PROQUEST].*

(Continued)

*Primary Examiner*—Tariq Hafiz
*Assistant Examiner*—Jonathan G Sterrett
(74) *Attorney, Agent, or Firm*—Young Law Firm, P.C.

(57) ABSTRACT

A computer-implemented method for managing a plurality of customer relationship plans may include a step of collecting profile check values from a database of customer data, the collected profile check values including customer data corresponding to profile checks for each of the plurality of customer relationship plans. The collected profile check values may then be applied to predefined selection criteria in one or more of the plurality of customer relationship plans. The selection criteria determines whether a customer relationship plan of the plurality of customer relationship plans applies to a customer. One or more customer relationship plans may then be assigned or de-assigned to each of the selected customers, depending upon whether the applied profile check values satisfy or fail to satisfy the predefined selection criteria, respectively. The assigned customer relationship plan(s) may then be applied and one or more synchronous and/or an asynchronous actions may be carried out upon the occurrence of a selectable customer event, as called for by applied customer relationship plan(s). The profile checks may include one or more plan indicator, such as customer opportunity size, customer size, market segment or a user-definable business event, for example.

48 Claims, 4 Drawing Sheets

U.S. PATENT DOCUMENTS

| | | | | |
|---|---|---|---|---|
| 5,956,693 | A | * | 9/1999 | Geerlings .................... 705/14 |
| 6,061,682 | A | * | 5/2000 | Agrawal et al. ............... 707/6 |
| 6,078,892 | A | * | 6/2000 | Anderson et al. ............. 705/10 |
| 6,272,478 | B1 | * | 8/2001 | Obata et al. .................. 706/12 |
| 6,477,521 | B1 | * | 11/2002 | Kumomura et al. ........... 707/1 |
| 6,901,406 | B1 | * | 5/2005 | Nabe et al. .................. 707/102 |
| 7,013,290 | B1 | * | 3/2006 | Ananian ....................... 705/27 |
| 2002/0046086 | A1 | * | 4/2002 | Pletz et al. ................... 705/14 |

OTHER PUBLICATIONS

Business Editors, Deloitte Consulting Customer Relationship Management Practice Completes 200th Successful Project; Industry-Leading Consultancy has more than 70 new Projects Underway, Business wire, New York, Feb. 23, 1999 [PROQUEST].*

Baltista et al., Customer Relationship Management: The Promise and the Reality, CMA Management, Hamilton, vol. 74, Issue 4, May 2000, start pp. 34 [PROQUEST].*

Business Editors, Diffusion Selects Intraware SubscribNet to Provide Software Update Services for Diffusion's Customer Relationship Management Application, Business Wire, New York, Dec. 1, 1998 [PROQUEST].*

* cited by examiner

METHODS AND SYSTEMS FOR DEFINING, APPLYING AND EXECUTING CUSTOMER CARE RELATIONSHIP PLANS

BACKGROUND OF THE INVENTION

1. Field of the Invention

The present invention relates generally to the management of customer relationships. More specifically, the present invention relates to the management, definition, application and execution of customer relationship plans to increase customer satisfaction, retention and profitability.

2. Description of the Related Art

For companies operating in today's dynamic and highly competitive markets, the development and maintenance of a comprehensive customer-oriented strategy is arguably the key to success. To maintain stability and growth of the business, companies must grow their customer base (customer acquisition), retain their existing customers (customer retention) and induce their existing customers to spend more (customer profitability). To retain and increase the profitability of customers, companies must ensure that its current customers remain loyal and satisfied with the products and services offered to them.

It is estimated that every five years, companies in the United States lose about 35% of their customer base by providing inadequate and untimely service to their customers. A purely reactive approach to the management of customer relationships has proven to be inadequate to achieve the twin goals of increasing both customer retention and profitability. Indeed, once certain customer business events (product returns, complaints, shipping delays, inadequate or unresponsive customer service, for example) have occurred, it may be too late to take effective remedial measures that will satisfy the customer. Therefore, it is desirable to treat customer relationships in a proactive manner, without waiting for the customer to communicate their dissatisfaction and/or without necessarily waiting for human interaction. However, not all customers can and should be treated equally, and such a proactive approach to customer care relationships should preferably treat each customer differently according to their customer status or according to some other definable criteria. Doing so increases cost effectiveness in the management of customers, increases both customer loyalty and profitability and improves the timeliness of the vendor's response to customer response.

What are needed, therefore, are computer-implemented methods and systems for automatically managing and applying customer relationship plans. What are also needed are computer-implemented methods and systems for proactively responding to customer business events by applying one or more selected customer relationship plans and carrying out actions specified by the applied customer relationship plans.

SUMMARY OF THE INVENTION

It is, therefore, an object of the present invention to provide computer-implemented methods and systems for automatically managing and applying customer relationship plans. It is another object of the present invention to provide computer-implemented methods and systems for proactively responding to customer business events by applying one or more selected customer relationship plans and carrying out actions specified by the applied customer relationship plans.

In accordance with the above-described objects and those that will be mentioned and will become apparent below, a computer-implemented method for managing a plurality of customer relationship plans, may include steps of collecting profile check values from a database of customer data, the collected profile check values including customer data corresponding to profile checks for each of the plurality of customer relationship plans; applying the collected profile check values to predefined selection criteria in one or more of the plurality of customer relationship plans, the selection criteria determining whether a customer relationship plan of the plurality of customer relationship plans applies to a customer; assigning and de-assigning one or more customer relationship plans to each of the selected customers depending upon whether the applied profile check values satisfy or fail to satisfy the predefined selection criteria, respectively and applying the assigned customer relationship plan(s) and carrying out, upon occurrence of a selectable customer event, a synchronous and/or an asynchronous action, as called for by the applied customer relationship plan(s).

According to further embodiments, the profile checks include one or more plan indicators selected from a group including customer opportunity size, customer size, market segment and a user-definable business event, for example. The profile checks may also include a definable range of plan indicators. The selection criteria may include a logical expression including one or more logical operators that operate upon the plan indicators. A detecting step may also be carried out, the detecting step detecting changed profile checks for each of the plurality of customer relationship plans, the profile check values applying step and the assigning step being carried out when the detecting step detects a changed profile check. The detecting step may be carried out asynchronously and/or at a selectable interval. A step may be carried out to organize all customer relationship plans assigned to a given customer of the selected customers into a plan portfolio for the given customer. A step of managing a selected customer's plan portfolio may also be carried out, the managing step including one or more of the steps of: viewing each customer relationship plan of the selected customer's plan portfolio; manually adding a customer relationship plan to the selected customer's plan portfolio; manually modifying a customer relationship plan in the selected customer's plan portfolio; manually enabling a customer relationship plan in the selected customer's plan portfolio; manually disabling a customer relationship plan from the selected customer's plan portfolio, and manually removing a customer relationship plan from the selected customer's plan portfolio. Manually added, modified, enabled and disabled customer relationship plans may thereafter be unaffected by the assigning and de-assigning steps. In contrast, a manually removed customer relationship plan may thereafter be susceptible to being assigned and thereafter de-assigned by the assigning and de-assigning step. A step of viewing an audit log of the customer relationship plan(s) assigned and de-assigned to one or more of the selected customers may also be carried out. The synchronous action may include a batch mode execution of a business procedure. The asynchronous action may include a real time execution of a business procedure. The business procedure executed in real time mode may include a script, a survey and/or an alert, for example. The business procedure executed in real time may return a list of user-selectable and executable actions. A defining step may be carried out to define a new customer relationship plan by specifying a plan header, defining the selection criteria and defining actions, conditions and outcomes of the new customer relationship plan. The plan header may include a name, a group, a priority and/or a description and effective dates for the new customer relationship plan. The method may also include a plan inquiry step, the plan inquiry step including a query by plan or a query by customer. The query by plan step enables management of a selected customer relationship plan and all customers to which the selected customer relationship plan is assigned, whereas the query by customer step enables management of all customer relationship plans assigned to one or more selected customers. The plurality of customer relationship plans may include, for example, one or more plan selected from a group including a critical customer management plan, an account plan, a premium customer plan, a non-profitable customer plan, a service plan, a customer retention plan, a customer satisfaction plan, a product plan, a preventative maintenance plan, a customer service plan and a product recall plan.

The present invention is also a computer system configured for managing a plurality of customer relationship plans, comprising at least one processor; at least one data storage device; a plurality of processes spawned by said at least one processor, the processes including processing logic for collecting profile check values from a database of customer data, the collected profile check values including customer data corresponding to profile checks for each of the plurality of customer relationship plans; applying the collected profile check values to predefined selection criteria in one or more of the plurality of customer relationship plans, the selection criteria determining whether a customer relationship plan of the plurality of customer relationship plans applies to a customer; assigning and de-assigning one or more customer relationship plans to each of the selected customers depending upon whether the applied profile check values satisfy or fail to satisfy the predefined selection criteria, respectively, and applying the assigned customer relationship plan(s) and carrying out, upon occurrence of a selectable customer event, a synchronous and/or an asynchronous action, as called for by the applied customer relationship plan(s).

The present invention, according to another embodiment thereof, is a machine-readable medium having data stored thereon representing sequences of instructions which, when executed by computing device, causes the computing device to managing a plurality of customer relationship plans by performing the steps of collecting profile check values from a database of customer data, the collected profile check values including customer data corresponding to profile checks for each of the plurality of customer relationship plans; applying the collected profile check values to predefined selection criteria in one or more of the plurality of customer relationship plans, the selection criteria determining whether a customer relationship plan of the plurality of customer relationship plans applies to a customer; assigning and de-assigning one or more customer relationship plans to each of the selected customers depending upon whether the applied profile check values satisfy or fail to satisfy the predefined selection criteria, respectively, and applying the one or more assigned customer relationship plans and carrying out, upon occurrence of a selectable customer event, a synchronous and/or an asynchronous action, as called for by the applied customer relationship plan(s).

DESCRIPTION OF THE INVENTION

Functional Description

The present invention provides an integrated system and method for managing and applying customer relationship plans to customers. The present invention allows organizations to create and execute different plans for different customers. The customer relationship plans, according to the present invention, may be fully configured by the deploying company (the company running the application(s) embodying the present invention) to ensure that the appropriate relationship plans are assigned and applied to the appropriate customers in a timely manner. Executing such customer relationship plans may improve timely responses to customer concerns, promote customer loyalty and enhance profitability.

An illustrative customer relationship plan is illustrated herewith. A hypothetical Business Online Corporation (BOC) has defined a plurality of customer relationship plans, one of which being a Critical Customer Plan. To become a "critical" customer, a BOC customer must satisfy a selection criteria based upon the customer's number of open requests and number of late orders. Such a selection criteria may be expressed as follows:

If (# of open requests >10) AND (# of late orders >20) then
   Customer is critical Else . . . Example 1
   Customer is not critical.

With reference to example 1 above, the present invention is a method and system for managing such customer relationship plans, detecting when a plan such as BOC's Critical Customer Plan should be assigned and de-assigned from selected BOC customers, applying selected customer relationship plan(s) to selected BOC customer(s) and taking whatever business procedures (actions) are specified by the applied customer relationship plan(s) (such as BOC's Critical Customer Plan, for example). The business procedures for a customer relationship plan (such as BOC's Critical Customer Plan) may include, by way of example:

sending a notification to a specified sales, support or managerial person when a customer becomes critical;
   automatically running a predefined customer script or workflow, and
   sending a status report to the customer every 24 hours.

Other illustrative customer relationship plans may include specific account plans, a series of hierarchical customer service plans (e.g., Gold, Silver and Bronze, for example), non-profitable customer plans, customer retention plans, customer satisfaction plans, specific product plans, preventative maintenance plans and product recall plans, for example. Any number of customer relationship plans, however, may be defined, managed, applied and executed according to the present invention.

Figure 1:
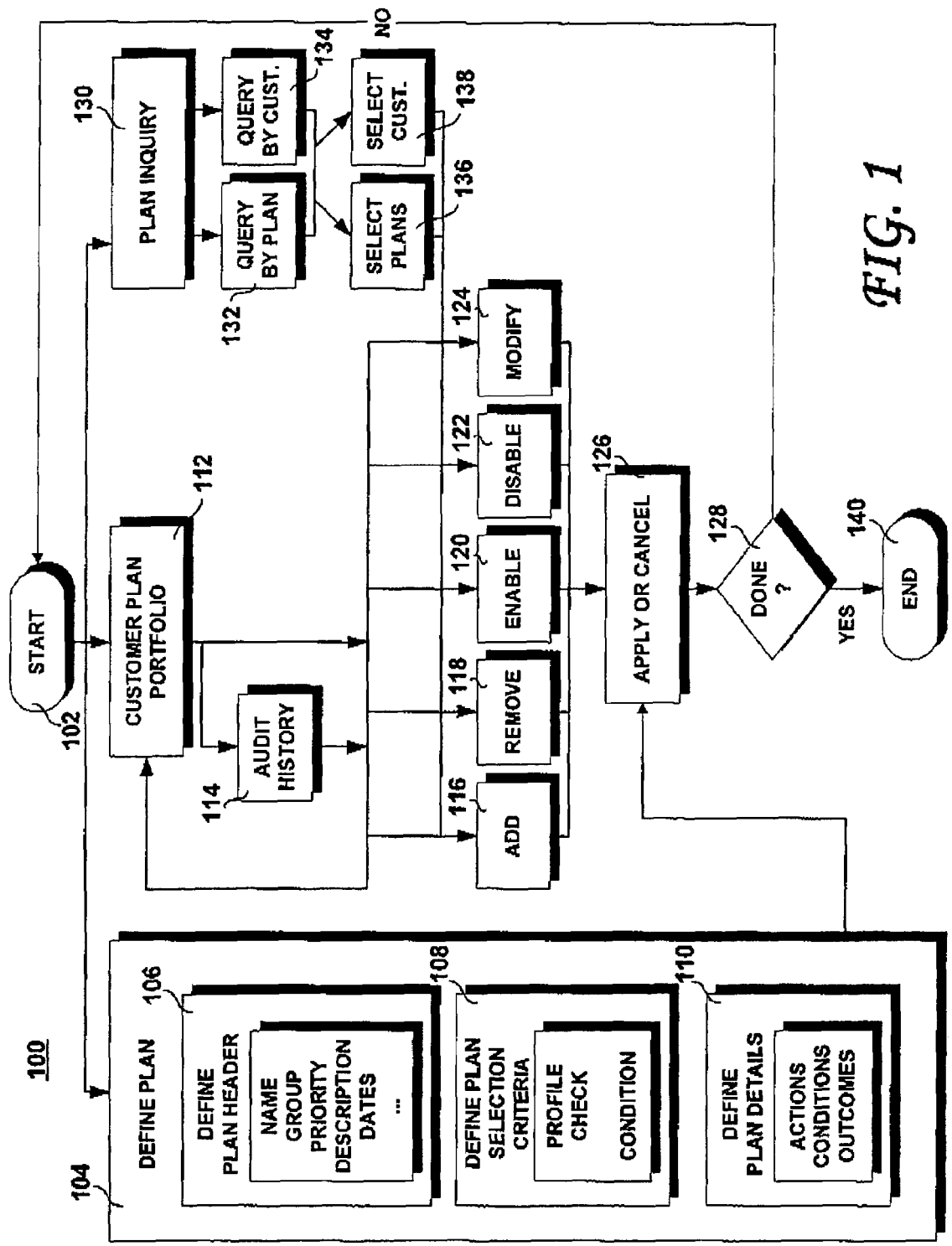
FIG. 1 is a flowchart of a method for managing customer relationship plans, according to an embodiment of the present invention.

FIG. 1 shows a flow chart for such a method 100 for managing customer relationship plans, according to an embodiment of the present invention. The method 100 may be advantageously embodied as an Internet application, using a suitable Word Wide Web browser, for example. The methods starts at 102, whereupon the user may be presented with a choice to define a new customer relationship plan at 104, manage the plan portfolio of a or several selected customers 112 or to carry out customer relationship plan inquiries, as shown at 130. As shown at 104, a new customer relationship plan may be defined by specifying a plan header, as shown at 106. The plan header may include, for example, a plan name, a plan group, a plan priority, a plan description and/or the effective dates of the plan. Defining the effective dates of a plan allows a new plan to be enabled only during a time-limited promotion, for example. As shown at reference 106, customer relationship plans may be named, grouped together and prioritized, to enable effective management thereof. By prioritizing the customer relationship plans, higher priority plans may be applied before lower priority plans. Also, prioritized plans may be viewed and managed as a collapsible and expandable hierarchical structure. After all or some of the plan header detailed above has been defined, a user of the present invention may be prompted to define the plan's condition or selection criteria, as shown at 108. Each customer relationship plan, according to the present invention, includes one or more profile checks. The profile checks define the selection criterion or criteria that must be satisfied for a customer relationship plan to be applied to a customer. Turning again to example 1 above, the profile checks of the Critical Customer Plan illustrated therein are the open requests and the late orders. Together with the greater than ">" operator and the logical "AND" operator, the profile checks form the selection criteria for BOC's Critical Customer Plan. That is, the selection criteria "(#of open requests >10) AND (# of late orders >20)" must evaluate to a logical TRUE for the plan to be apply and/or be assigned to any of BOC's customers. The profile checks may include one or more plan indicators, such as customer opportunity size, customer size, market segment and other user-definable customer characteristics or business events, for example. In broad terms, a customer opportunity size may be defined as a potential revenue event associated with a (current or potential) customer. The opportunity size may have an opportunity value associated therewith, which opportunity value quantifies the value of the items or services sold or to be sold to the customer. The profile checks may include a user-definable range of such plan indicators. For example, the selection criteria for the application of a customer relationship plan (a customer relationship plan called the "High Value Customer Plan", for example) to a particular customer may be defined so that all customers whose opportunity size falls within a user-definable range (between $500,000 and $2,000,000, for example) are assigned to the High Value Customer Plan. Therefore, the "High Value Customer Plan" will be applicable to all or a selectable subsection of customers whose computed values for the specified opportunity check value (the profile check value) falls between $500,000 and $2,000,000. In addition or in place of the range of plan indicators, the selection criteria may include a logical expression including one or more logical operators, as shown in Example 1. The selection criteria, moreover, may include a combination of different plan indicators, ranges of plan indicators and logical operators to achieve a fine-grained control over the application of plans to customers. For example, the market segment plan indicator may be combined with a range of opportunity size plan indicators, such as:

=If market segment=Entertainment AND (20># of open requests >10) then

Customer is critical
Else . . . Example 2
Customer is not critical.

Therefore, the selection criteria of Example 2 will evaluate to a logical TRUE for all customers or a selected subsection of customers that are in the entertainment business and whose open request profile checks value is between 10 and 20, meaning those customer having between 10 and 20 open requests outstanding.

Returning now to FIG. 1, having defined the plan header 106 and the selection criteria 108, the user may be prompted to define the details of the new plan, as shown at 110. Specifically, the user may be prompted to define what the new plan does (actions), the conditions under which the new plan will carry out the defined actions (conditions) and the outcome(s) of carrying out the defined actions. In addition, a textual description of the above may be entered, to facilitate later review and editing of the new customer relationship plan. The actions defined under the new customer relationship plan may be carried out synchronously (in the background, in batch mode, for example) or may be carried out asynchronously (in real or near real time). Those defined actions that require immediate action are preferably specified as being carried out asynchronously, such as when an alert to a predefined person or persons is to be generated or such as when a predefined script is to be immediately run. Those actions that do not need to be carried out immediately are preferably specified as being carried out synchronously, such as when a status report is to be generated at regular intervals, which report may be run as a background process.

All customer relationship plans assigned to a customer may be logically grouped into a plan portfolio for that customer, as indicated at 112 in FIG. 1. Users of the computer-implemented method and system of the present invention may manage such customer plan portfolios and carry out a number of actions on the constituent customer relationship plans thereof. Indeed, a user may view each customer relationship plan of the selected customer's plan portfolio, manually add a new customer relationship plan to the selected customer's plan portfolio as shown at 116 by carrying out the above-described steps 106, 108 and 110 and manually assign the new plan to the customer, manually modify an existing customer relationship plan in the selected customer's plan portfolio as shown at 124, manually enable a customer relationship plan in the selected customer's plan portfolio as shown at 120; manually disable a customer relationship plan from the selected customer's plan portfolio as shown at 122, and manually remove a customer relationship plan from the selected customer's plan portfolio, as shown at 118. The user may also, as shown at 114, view an historical audit log of all plan portfolio activities 116, 118, 120, 122 and/or 124 having been carried out on any of the constituent plans of the customer's plan portfolio. Alternatively, as shown at 130, the user may also carry out a plan inquiry. The plan inquiry step 130 may include a query by plan or a query by customer, as shown at 132 and 134 respectively. The query by plan step 132 enables the user to select a customer relationship plan or plans and view all customers to which the selected customer relationship plan is assigned, as shown at 136 and 138, respectively. Similarly, the query by customer step 134 enables the user to view all of the customer relationship plans assigned to a selected customer or selected customers, as shown at 136 and 138, respectively. In either case, the user may then add a new plan (116) or remove (118), enable (120), disable (122) and/or modify (124) any customer relationship plan or plans retrieved through the query by plan step 132 or the query by customer step 134. The customer relationship plan(s) may then be applied or cancelled, as shown at 126. If at 128 the user has finished defining new customer relationship plans, managing a customer's plan portfolio and/or performing plan inquiries, the method may proceed to step 140. If at 128 the user wishes to continue the management of the customer relationship plans, the methods may revert back to step 102.

Figure 2:
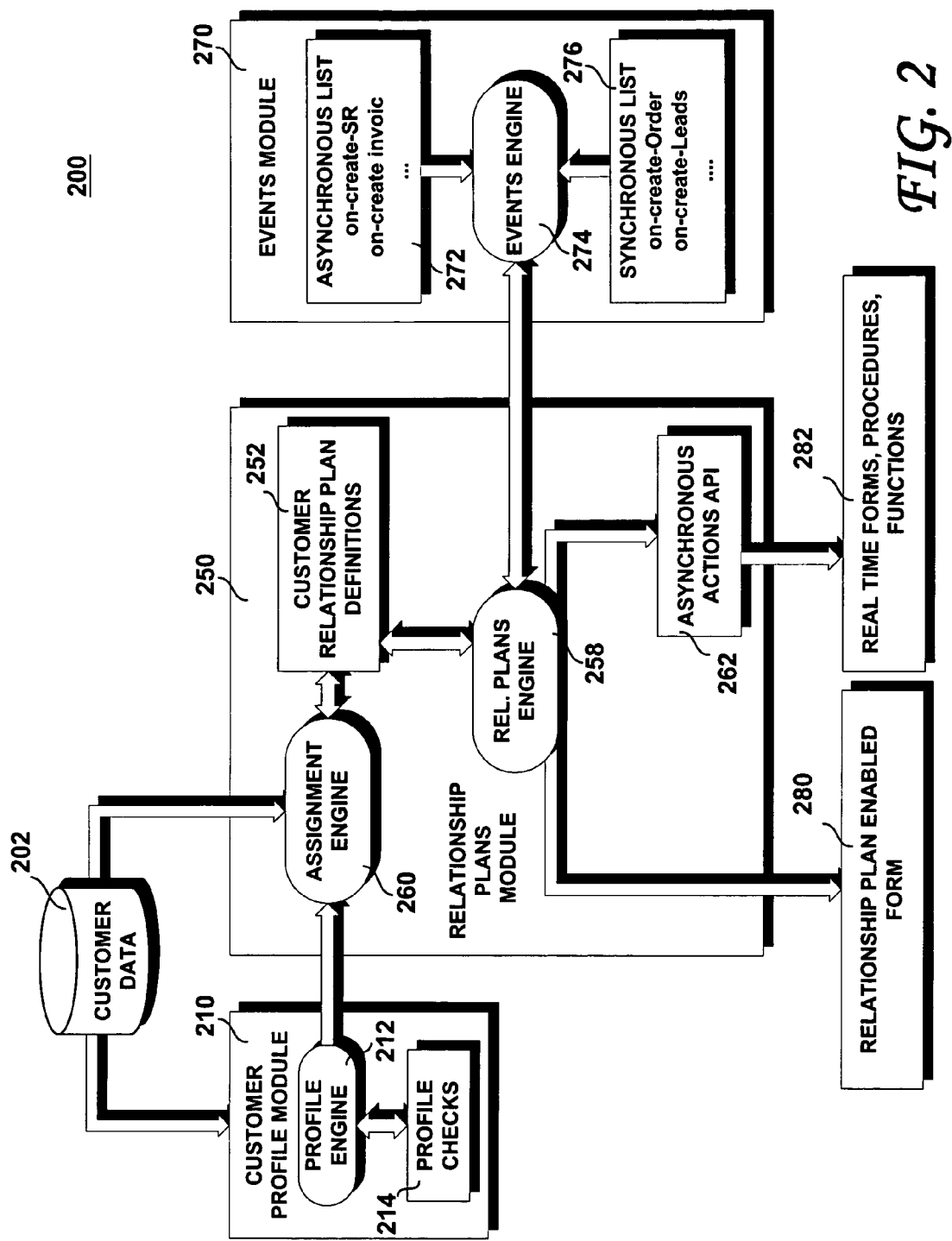
FIG. 2 is a block diagram of the software architecture of a system for managing customer relationship plans, according to an embodiment of the present invention.

FIG. 2 is a block diagram of the software architecture of a system 200 for managing customer relationship plans, according to an embodiment of the present invention. The system 200 may include a database of customer data 202, a customer profile module 210, a relationship module 250 and an events module 270. The customer profile module 210 includes a profile engine 212 that collects the values of the profile checks (hereafter, the profile check values) defined in the profile checks unit 214 from the database of customer data 202. The profile checks unit 214 stores the profile checks for the plurality of customer relationship plans managed by the system 200. The profile engine 212, therefore, retrieves selected customer data from the customer database 202, the selected customer data corresponding to the profile checks defined in the profile checks unit 214. The profile check values are then the values of the customer data retrieved from database 202 associated with the profile checks defined in the profile checks unit 114 for one or more of the customer relationship plans. For example, should the profile checks for a plan include the opportunity size plan indicator, the profile engine 212 would collect the opportunity size data for one or more selected customers (or for all of the deploying company's customers) from the customer data database 202 and pass the collected corresponding profile check values to the assignment engine 260 of the relationship plans module 250.

The relationship plans module 250 may include, according to an embodiment of the present invention, a plan definitions unit 252, the plan assignment engine 260, a relationship plans engine 258 and an asynchronous actions Applications Program Interface (API) 282. As is known, an API is a specific method prescribed by a computer operating system or by another application program by which a programmer writing an application program can make requests of the operating system or another application. The plan definitions unit 252 may include the definition of each customer relationship plan to be applied to the deploying company's customer data. The definition of each of the customer relationship plans may include, as detailed relative to reference numeral 104 in FIG. 1, a plan header 106, selection criteria 108 and the plan details 110. The assignment engine 260 applies the profile check values obtained from the profile engine 212 to the plan selection criteria or condition(s) obtained from the plan definitions unit 252. When the selection criteria or condition(s) of a customer relationship plan or plans evaluate to a logical TRUE or are otherwise satisfied when the profile check values associated with a customer or customers are applied thereto, the plan assignment engine 260 assigns the plan(s) to the customer(s) with whom the profile check values are associated. In this manner, the assignment engine 260 may apply all profile check values to all of the selection criteria of each customer relationship plan and selectively assign plans to customers based upon the customer data stored in the database 202. In like manner, the plan assignment engine 260 may de-assign any plan from any customer (and/or from the customer's plan portfolio) when the customer's profile check values, when applied to the selection criteria of the customer's current customer relationship plans, fail to evaluate to a logical TRUE or fail to be otherwise satisfied. A de-assigned customer relationship plan, therefore, may be removed from the customer's plan portfolio. A removed or de-assigned customer relationship may, at some later time, be re-assigned to the customer if the customer's profile check values again satisfy that plan's selection criteria. According to an embodiment of the present invention, therefore, the plan assignment engine 260 uses the same selection criteria for assigning and de-assigning a customer relationship plan to the customers. This assigning and de-assigning may occur at predefined (regular, for example) intervals, or may occur asynchronously, upon the occurrence of a predefined event or events.

Figure 3:
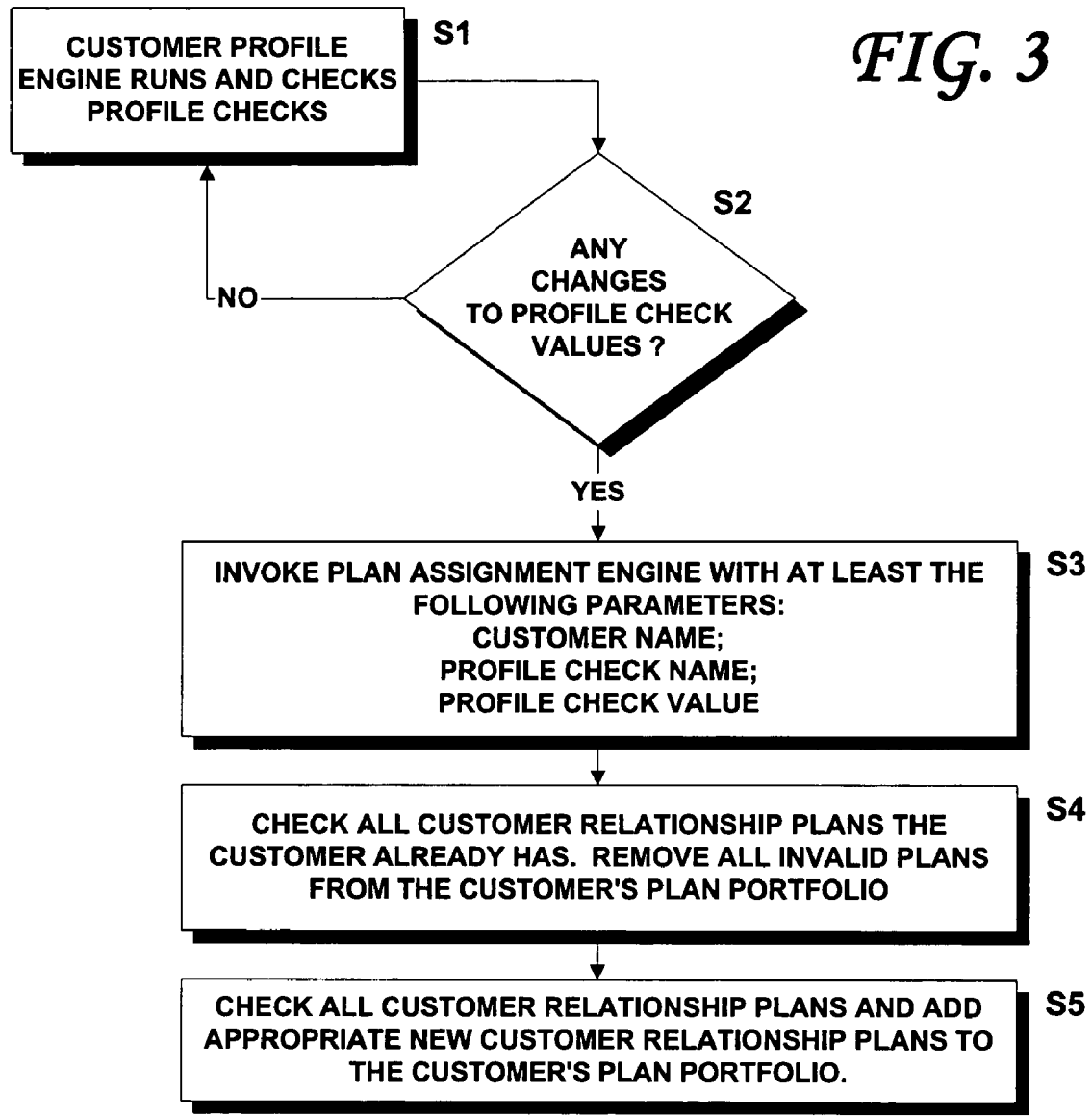
FIG. 3 is a flowchart of a process assigning and de-assigning customer relationship plans to customers, according to an embodiment of the present invention.

FIG. 3 is a flow chart of a process assigning and de-assigning customer relationship plans to customers, according to an embodiment of the present invention. As shown therein, step S1 calls for the profile engine 212 to run and collect profile check values from the customer data in database 202 corresponding to the profile checks defined in profile checks unit 214. As shown in step S2, the newly collected profile check values may then be compared with corresponding previously collected profile check values. If any of the newly collected profile check values differ from the corresponding previously collected profile check values, as shown in step S2, the method may proceed to step S3. Otherwise, the method may revert back to step S1. A changed profile checks value may be indicative of a change in the customer's status relative to the deploying company and may indicate that the customer's plan portfolio should be updated or at least checked to determine the current applicability of each constituent customer relationship plan thereof. If there has been a change in any of the profile check values, the plan assignment engine 260 may be invoked, as shown at S3. According to an embodiment of the present invention, at least the following parameters may be passed to the profile assignment engine 260: the name of the customer whose profile check values changed, the name of the profile check whose value has changed and the profile check value itself. These parameters may then be applied to the selection criteria or conditions defined in some or all of the customer relationship plans in the customers' plan portfolios. Any customer relationship plan whose criteria no longer evaluate to a logical TRUE or whose conditions are no longer satisfied may be de-assigned from the customer's plan portfolio, as shown at step S4. As shown in step S5, all of the defined customer relationship plans may then be checked and the changed profile check values may then be applied to the selection criteria and/or conditions of each customer relationship plan. The plan or plans whose selection criteria evaluate to a logical TRUE or whose conditions are otherwise satisfied may be assigned to the customer and may now form one of the constituent plans of the customer's plan portfolio.

According to an embodiment of the present invention, when a customer relationship plan is manually added, modified, enabled or disabled as shown in FIG. 1 at 116, 124, 120 and 122, respectively, that customer relationship plan may thereafter be unaffected by the assigning and de-assigning steps. Therefore, even if customer check values would thereafter otherwise satisfy the selection criteria or condition of a manually added, modified, enabled or disabled plan, the plan is not susceptible to being assigned or thereafter de-assigned by the assignment engine 260. This preserves the integrity of the assignment and de-assignment process by ensuring that the plan assignment selection criteria is identical to the plan de-assignment selection criteria. However, a manually removed customer relationship plan may thereafter susceptible to being re-assigned (and later de-assigned)

by the assigning and de-assigning step. In this manner, a human plan manager, for example may override the assignment engine 260 at his or her discretion.

Returning now to FIG. 2, the events module 270 may include an events engine 274 that communicates with an asynchronous list module 272 and a synchronous list module 276. The events module 274 may detect a specified list of events in the deploying company's application environment. According to the present invention, event detection may be based upon a definable expression that returns a logical TRUE or FALSE or may be based upon a counter function. For example, a counter function may be defined to detect the occurrence of any customer making more than five requests for customer service within a selectable period of time. When an event of the specified list of events (such as the creation of a sales contract, sales order, invoice, time-based events, a request for customer service, late payments of invoices, etc.) occurs in one of the deploying company's applications that is coupled to the system 200 through the database 202, the events module 274 communicates the occurrence of the event to the relationship plans engine 258, which executes the appropriate customer relationship plan of the customer's plan portfolio. For example, the asynchronous list of events 272 in FIG. 2 identifies the creation of a service request (SR) and the creation of an invoice to a customer as an asynchronous event—that is, an event that requires immediate, real time action. The synchronous list 276, on the other hand, identifies the creation of an order and the creation of a lead as synchronous events that only require background or batch execution. The lists 272 and 276, however, are entirely user-definable, the representations in FIG. 2 being for purposes of illustration only. For example, a "Critical Customer Plan" may specify the execution of some immediate action, such as the generation of an alert, the invocation of some process workflow, the running of a survey or a predefined script when an action listed in the asynchronous list 272 occurs, as detected by the events engine 274. Continuing with this example, when a customer to whom a "Critical Customer Plan" has been assigned generates a service request on one of the deploying company's World Wide Web applications (for example), this event may be detected by the events engine 274. The customer's portfolio is checked and any action listed in one of the customer's plans that is associated with the detected event is carried out through real time forms, procedure or functions 282, via an appropriate asynchronous actions API, as shown at 262. According to an embodiment of the present invention, the relationship plans engine may return a list of user-selectable and executable actions to a predefined person or persons, who may select those actions to execute by selecting from the list presented. On the other hand, should an action be detected by the events engine 274 that is listed in the synchronous list 276, the outcome(s) listed in the plan details 110 in FIG. 1 of the customer's assigned plans may be carried out in the background, through an appropriate World Wide Web (Web)-enabled form, as shown at 280, for example.

Hardware Description

Figure 4:
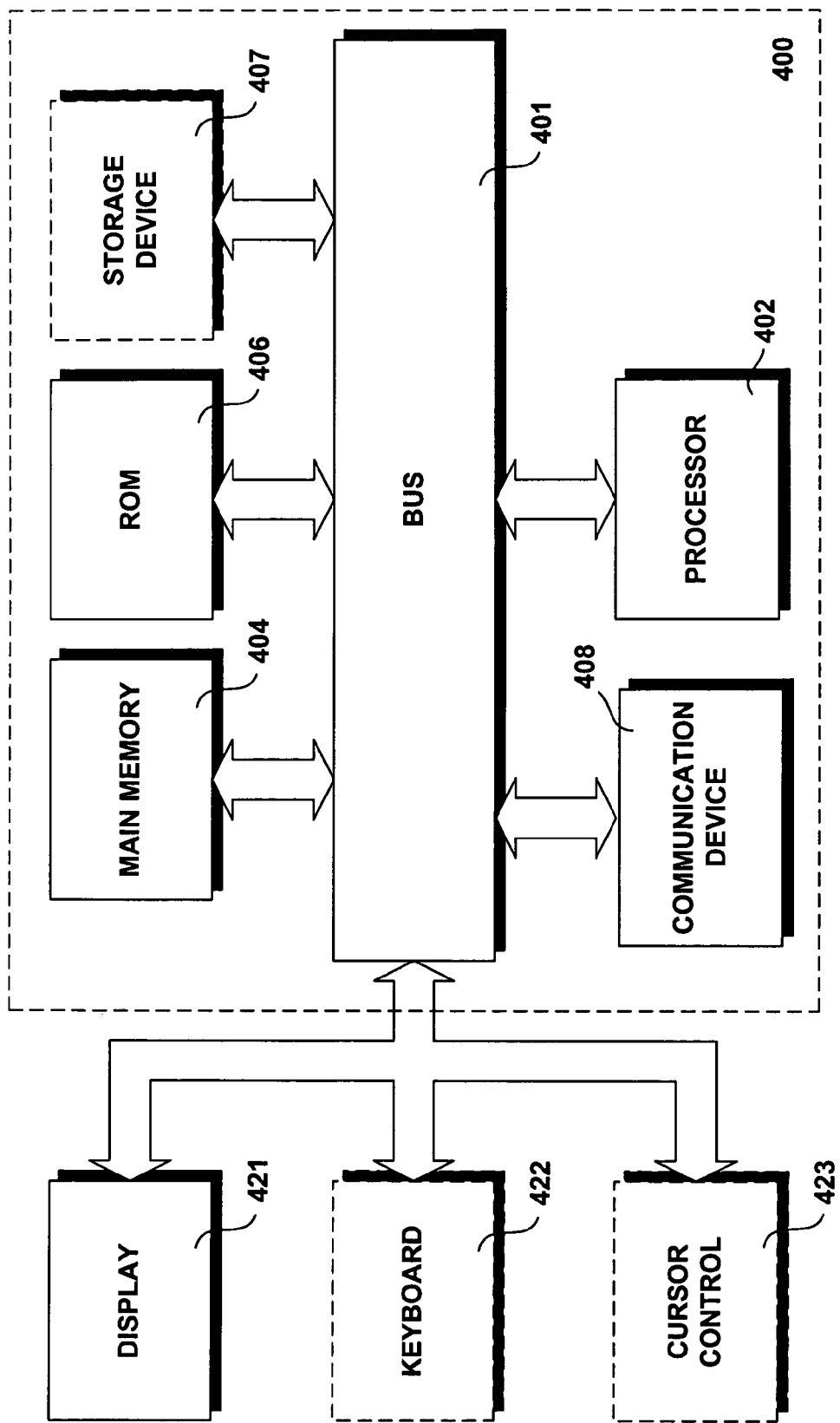
FIG. 4 is a block diagram of a computing device with which the methods of the present invention may be implemented.

FIG. 4 illustrates a block diagram of a computing device 400 with which an embodiment of the present invention may be implemented. Computing device 400 includes a bus 401 or other communication mechanism for communicating information, and a processor 402 coupled with bus 401 for processing information. Computing device 400 further comprises a random access memory (RAM) or other dynamic storage device 404 (referred to as main memory), coupled to bus 401 for storing information and instructions to be executed by processor 402. Main memory 404 also may be used for storing temporary variables or other intermediate information during execution of instructions by processor 402. Computing device 400 may also include a read only memory (ROM) and/or other static storage device 406 coupled to bus 401 for storing static information and instructions for processor 402. A data storage device 407, such as a magnetic disk or optical disk, may be coupled to bus 401 for storing information and instructions. A communication device 408, such as a modem or network (such as Ethernet, for example) card is also coupled to the bus 401 to provide access to a network.

The computing device 400 may also be coupled via bus 401 to a display device 421, such as a cathode ray tube (CRT), for displaying information to a computer user. An alphanumeric input device 422, including alphanumeric and other keys, is typically coupled to bus 401 for communicating information and command selections to processor 402. Another type of user input device may be user's own voice or cursor control 423, such as a mouse, a trackball, or cursor direction keys for communicating direction information and command selections to processor 402 and for controlling cursor movement on display 421.

The present invention is related to the use of computing device 400 to manage customer relationship plans (over a computer network including the Internet, for example). According to one embodiment, the management of customer relationship plans may be carried out by one or more computing devices 400 in response to processor(s) 402 executing sequences of instructions contained in memory 404. Such instructions may be read into memory 404 from another computer-readable medium, such as data storage device 407 and/or from a remotely located server. Execution of the sequences of instructions contained in memory 404 causes processor(s) 402 to implement the cart sharing functionality described above. In alternative embodiments, hard-wired circuitry may be used in place of or in combination with software instructions to implement the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A computer-implemented method for managing a plurality of customer relationship plans, comprising the steps of:

collecting profile check values from a database of customer data of a plurality of customers, the collected profile check values including customer data corresponding to profile checks for each of the plurality of customer relationship plans, the profile checks including at least one plan indicator selected from a group consisting of customer opportunity size, customer size and market segment;

applying the collected profile check values to predefined selection criteria in at least one of the plurality of customer relationship plans, the selection criteria defining at least one of a predetermined profile check value threshold that must be exceeded and a condition that must be satisfied for a customer relationship plan of the plurality of customer relationship plans to apply to a customer of the plurality of customers;

selectively assigning or de-assigning at least one customer relationship plan to selected customers of the plurality of customers depending upon whether the applied profile check values satisfy or fail to satisfy the predefined selection criteria, respectively;

organizing all customer relationship plans assigned to a given customer of the selected customers into a plan portfolio for the given customer;

applying the at least one assigned customer relationship plan and carrying out, upon occurrence of a selectable customer event, at least one of a synchronous and an asynchronous action, as called for by the at least one applied customer relationship plan, and detecting changed profile check values for each of the plurality of customer relationship plans and carrying out at least the collecting and applying steps when the detecting step detects a changed profile check value.

2. The method of claim 1, wherein the profile checks include a definable range of plan indicators.

3. The method of claim 1, wherein the selection criteria includes a logical expression including at least one logical operator that operates upon the plan indicators.

4. The method of claim 1, wherein the detecting step is carried out at least one of asynchronously and at a selectable interval.

5. The method of claim 1, further including a step of managing a selected customer's plan portfolio, the managing step including at least one of the steps of:

viewing each customer relationship plan of the selected customer's plan portfolio;

manually adding a customer relationship plan to the selected customer's plan portfolio;

manually modifying a customer relationship plan in the selected customer's plan portfolio;

manually enabling a customer relationship plan in the selected customer's plan portfolio;

manually disabling a customer relationship plan from the selected customer's plan portfolio, and manually removing a customer relationship plan from the selected customer's plan portfolio.

6. The method of claim 5, wherein manually added, modified, enabled and disabled customer relationship plans are thereafter unaffected by the assigning and de-assigning steps.

7. The method of claim 5, wherein the manually removed customer relationship plan is thereafter susceptible to being assigned and de-assigned by the assigning and de-assigning step.

8. The method of claim 1, further including a step of viewing an audit log of the at least one customer relationship plan assigned and de-assigned to at least one of the selected customers.

9. The method of claim 1, wherein the synchronous action includes a batch mode execution of a business procedure.

10. The method of claim 1, wherein the asynchronous action includes a real time execution of a business procedure.

11. The method of claim 10, wherein the business procedure executed in real time mode includes at least one of a script, a survey and an alert.

12. The method of claim 11, wherein the business procedure executed in real time returns a list of user-selectable and executable actions.

13. The method of claim 1, further comprising the step of defining a new customer relationship plan by specifying a plan header, defining the selection criteria and defining actions, conditions and outcomes of the new customer relationship plan.

14. The method of claim 13, wherein the plan header includes at least one of a name, a group, a priority, a description and effective dates for the new customer relationship plan.

15. The method of claim 1, further including a plan inquiry step, the plan inquiry step including a query by plan or a query by customer, the query by plan step enabling management of a selected customer relationship plan and all customers to which the selected customer relationship plan is assigned, the query by customer step enabling management of all customer relationship plans assigned to at least one selected customer.

16. The method of claim 1, wherein the plurality of customer relationship plans includes at least one plan selected from a group including a critical customer management plan, an account plan, a premium customer plan, a non-profitable customer plan, a service plan, a customer retention plan, a customer satisfaction plan, a product plan, a preventative maintenance plan, a customer service plan and a product recall plan.

17. A computer system configured for managing a plurality of customer relationship plans, comprising:

at least one processor;

at least one data storage device;

a plurality of processes spawned by said at least one processor, the processes including processing logic for:

collecting profile check values from a database of customer data of a plurality of customers, the collected profile check values including customer data corresponding to profile checks for each of the plurality of customer relationship plans, the profile checks including at least one plan indicator selected from a group consisting of customer opportunity size, customer size and market segment;

applying the collected profile check values to predefined selection criteria in at least one of the plurality of customer relationship plans, the selection criteria defining at least one of a predetermined profile check value threshold that must be exceed and a condition that must be satisfied for a customer relationship plan of the plurality of customer relationship plans to apply to a customer of the plurality of customers;

selectively assigning or de-assigning at least one customer relationship plan to selected customers of the plurality of customers depending upon whether the applied profile check values satisfy or fail to satisfy the predefined selection criteria, respectively;

organizing all customer relationship plans assigned to a given customer of the selected customers into a plan portfolio for the given customer;

applying the at least one assigned customer relationship plan and carrying out, upon occurrence of a selectable customer event, at least one of a synchronous and an asynchronous action, as called for by the at least one applied customer relationship plan, and detecting changed profile check values for each of the plurality of customer relationship plans and carrying out at least the collecting and applying steps when the detecting step detects a changed profile check value.

18. The computer system of claim 17, wherein the profile checks include a definable range of plan indicators.

19. The computer system of claim 17, wherein the selection criteria includes a logical expression including at least one logical operator that operates upon the plan indicators.

20. The computer system of claim 17, wherein the detecting step is carried out at least one of asynchronously and at a selectable interval.

21. The computer system of claim 17, further including processing logic for managing a selected customer's plan portfolio by carrying out at least one of the steps of:
- viewing each customer relationship plan of the selected customer's plan portfolio;
- manually adding a customer relationship plan to the selected customer's plan portfolio;
- manually modifying a customer relationship plan in the selected customer's plan portfolio;
- manually enabling a customer relationship plan in the selected customer's plan portfolio;
- manually disabling a customer relationship plan from the selected customer's plan portfolio, and
- manually removing a customer relationship plan from the selected customer's plan portfolio.

22. The computer system of claim 21, wherein manually added, modified, enabled and disabled customer relationship plans are thereafter unaffected by the assigning and de-assigning steps.

23. The computer system of claim 21, wherein the manually removed customer relationship plan is thereafter susceptible to being assigned and de-assigned by the assigning and de-assigning step.

24. The computer system of claim 17, further including processing logic for viewing an audit log of the at least one customer relationship plan assigned and de-assigned to at least one of the selected customers.

25. The computer system of claim 17, wherein the synchronous action includes a batch mode execution of a business procedure.

26. The computer system of claim 17, wherein the asynchronous action includes a real time execution of a business procedure.

27. The computer system of claim 26, wherein the business procedure executed in real time mode includes at least one of a script, a survey and an alert.

28. The computer system of claim 26, wherein the business procedure executed in real time returns a fist of user-selectable and executable actions.

29. The computer system of claim 17, further comprising processing logic for defining a new customer relationship plan by specifying a plan header, defining the selection criteria and defining actions, conditions and outcomes of the new customer relationship plan.

30. The computer system of claim 29, wherein the plan header includes at least one of a name, a group, a priority, a description and effective dates for the new customer relationship plan.

31. The computer system of claim 17, further including processing logic for carrying out a plan inquiry step, the plan inquiry step including a query by plan or a query by customer, the query by customer relationship plan step enabling management of a selected customer relationship plan and all customers to which the selected customer relationship plan is assigned, the query by customer step enabling management of all customer relationship plans assigned to at least one selected customer.

32. The computer system of claim 17, wherein the plurality of customer relationship plans includes at least one plan selected from a group including a critical customer management plan, an account plan, a premium customer plan, a non-profitable customer plan, a service plan, a customer retention plan, a customer satisfaction plan, a product plan, a preventative maintenance plan, a customer service plan and a product recall plan.

33. A machine-readable medium having data stored thereon representing sequences of instructions which, when executed by computing device, causes said computing device to managing a plurality of customer relationship plans by performing the steps of:
- collecting profile check values from a database of customer data of a plurality of customers, the collected profile check values including customer data corresponding to profile checks for each of the plurality of customer relationship plans, the profile checks including at least one plan indicator selected from a group consisting of customer opportunity size, customer size and market segment;
- applying the collected profile check values to predefined selection criteria in at least one of the plurality of customer relationship plans, the selection criteria defining at least one of a predetermined profile check value threshold that must be exceed and a condition that must be satisfied for a customer relationship plan of the plurality of customer relationship plans to apply to a customer of the plurality of customers;
- selectively assigning or de-assigning at least one customer relationship plan to selected customers of the plurality of customers depending upon whether the applied profile check values satisfy or fail to satisfy the predefined selection criteria, respectively;
- organizing all customer relationship plans assigned to a given customer of the selected customers into a plan portfolio for the given customer;
- applying the at least one assigned customer relationship plan and carrying out, upon occurrence of a selectable customer event, at least one of a synchronous and an asynchronous action, as called for by the at least one applied customer relationship plan, and
- detecting changed profile check values for each of the plurality of customer relationship plans and carrying out at least the collecting and applying steps when the detecting step detects a changed profile check value.

34. The medium of claim 33, wherein the profile checks include a definable range of plan indicators.

35. The medium of claim 33, wherein the selection criteria includes a logical expression including at least one logical operator that operates upon the plan indicators.

36. The medium of claim 33, wherein the detecting step is carried out at least one of asynchronously and at a selectable interval.

37. The medium of claim 33, further including a step of managing a selected customer's plan portfolio, the managing step including at least one of the steps of:
- viewing each customer relationship plan of the selected customer's plan portfolio;
- manually adding a customer relationship plan to the selected customer's plan portfolio;
- manually modifying a customer relationship plan in the selected customer's plan portfolio;
- manually enabling a customer relationship plan in the selected customer's plan portfolio;
- manually disabling a customer relationship plan from the selected customer's plan portfolio, and
- manually removing a customer relationship plan from the selected customer's plan portfolio.

38. The medium of claim 37, wherein manually added, modified, enabled and disabled customer relationship plans are thereafter unaffected by the assigning and de-assigning steps.

39. The medium of claim 37, wherein the manually removed customer relationship plan is thereafter susceptible to being assigned and de-assigned by the assigning and de-assigning step.

40. The medium of claim 33, further including a step of viewing an audit log of the at least one customer relationship plan assigned and de-assigned to at least one of the selected customers.

41. The medium of claim 33, wherein the synchronous action includes a batch mode execution of a business procedure.

42. The medium of claim 33, wherein the asynchronous action includes a real time execution of a business procedure.

43. The medium of claim 42, wherein the business procedure executed in real time mode includes at least one of a script, a survey and an alert.

44. The medium of claim 43, wherein the business procedure executed in real time returns a list of user-selectable and executable actions.

45. The medium of claim 33, further comprising the step of defining a new customer relationship plan by specifying a plan header, defining the selection criteria and defining actions, conditions and outcomes of the new customer relationship plan.

46. The medium of claim 45, wherein the plan header includes at least one of a name, a group, a priority, a description and effective dates for the new customer relationship plan.

47. The medium of claim 33, further including a plan inquiry step, the plan inquiry step including a query by plan or a query by customer, the query by plan step enabling management of a selected customer relationship plan and all customers to which the selected customer relationship plan is assigned, the query by customer step enabling management of all customer relationship plans assigned to at least one selected customer.

48. The medium of claim 33, wherein the plurality of customer relationship plans includes at least one plan selected from a group including a critical customer management plan, an account plan, a premium customer plan, a non-profitable customer plan, a service plan, a customer retention plan, a customer satisfaction plan, a product plan, a preventative maintenance plan, a customer service plan and a product recall plan.

* * * * *

UNITED STATES PATENT AND TRADEMARK OFFICE
CERTIFICATE OF CORRECTION

| | | |
|---|---|---|
| PATENT NO. | : 7,069,231 B1 | Page 1 of 1 |
| APPLICATION NO. | : 09/620167 | |
| DATED | : June 27, 2006 | |
| INVENTOR(S) | : Bulent Cinarkaya, Javed Hasan and Smita Kolhatkar | |

It is certified that error appears in the above-identified patent and that said Letters Patent is hereby corrected as shown below:

Column 13, line 46, replace [fist] with -- list --.

Signed and Sealed this

Twelfth Day of September, 2006

JON W. DUDAS
*Director of the United States Patent and Trademark Office*